UNITED STATES PATENT OFFICE 2,009,569

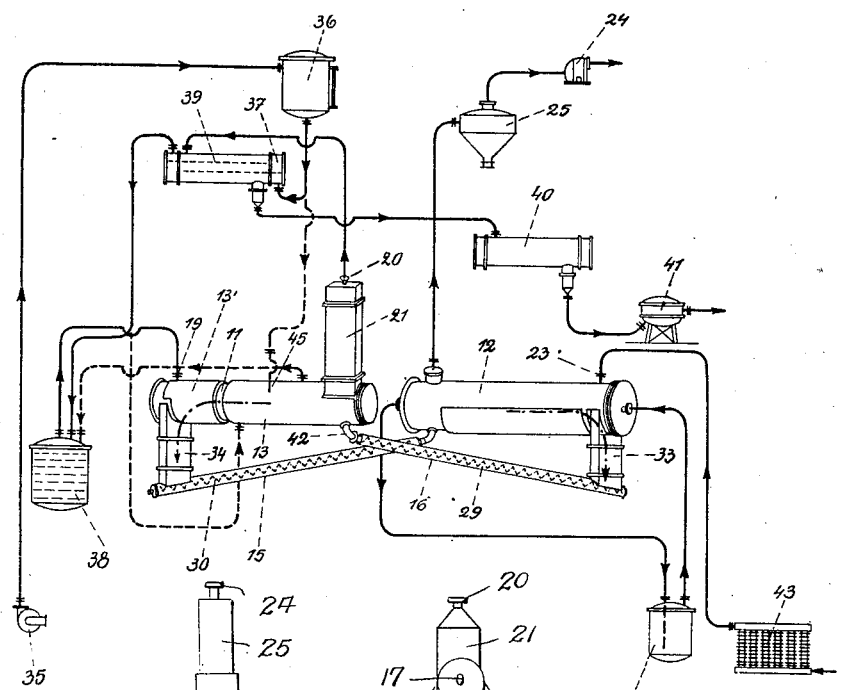

APPARATUS FOR DRYING VAPORS OR GASES

Theodor Wallis, Dessau-Ziebigk in Anhalt, and Oskar Falek, Wiederitzsch, near Leipzig, Germany, assignors to I. G. Farbenindustrie Aktiengesellschaft, Frankfort-on-the-Main, Germany Application April 3, 1933, Serial No. 664,276
In Germany March 30, 1931

5 Claims. (Cl. 183—4)

Our present invention relates to a new apparatus for dehydrating volatile substances.

One of its objects is to provide an apparatus which works continuously and in which a pulverulent drying agent is continuously used and regenerated after having absorbed the water content of the substances to be dried.

An additional object of our invention is a specific arrangement of the different means such as vaporizers, cooling and heating devices, drying device, regenerating device, filters and so on, allowing to carry out the total dehydrating process with as small an expenditure of energy as possible.

Further objects of our invention will be seen from the detailed specification following hereafter.

This application is a continuation-in-part of our copending application Ser. No. 600,730, filed March 23, 1932 where we have disclosed an apparatus for continuously drying volatilized organic liquids with the aid of calcined gypsum, said apparatus comprising a drum for binding the water contained in the vapors of the liquid, a further drum for regenerating the drying agent and a distinct connection between said drums preventing gas circulation between the drums.

In this former application we have disclosed inter alia a process for continuously removing water from organic liquids by boiling the latter and passing the vapors in counter-current through a circulating mass of finely distributed calcium sulfate which is completely dehydrated at about 160 to about 200° C., which is used in such a proportion that it is converted by absorption of steam contained in the moist vapors into the semihydrate $2CaSO_4 \cdot H_2O$ and which is again completely dehydrated after having passed the dehydrating zone for the vapors or gases to be dried.

According to our present invention, this continuous dehydation process preferably is carried out in an apparatus hereinafter described. This apparatus may likewise be used for carrying out related processes for dehydrating either organic liquids in the vaporous state or organic or inorganic gases with the aid of dehydrators other than anhydrous gypsum such as, for instance, anhydrous copper sulfate, magnesium sulfate, alkali metal sulfates, alkali metal acetates or generally water absorbing or adsorbing compounds, which retain their pulverulent state after having taken up the moisture contained in the substances to be dried.

Reference is made to the accompanying drawings, in which

Fig. 3 is a front view of Fig. 1.

Fig. 4 shows diagrammatically a complete arrangement of the different means for the continuous dehydration of a liquid such as, for instance, ethyl alcohol.

In these figures the same reference characters are used to indicate the same parts.

Figure 1:
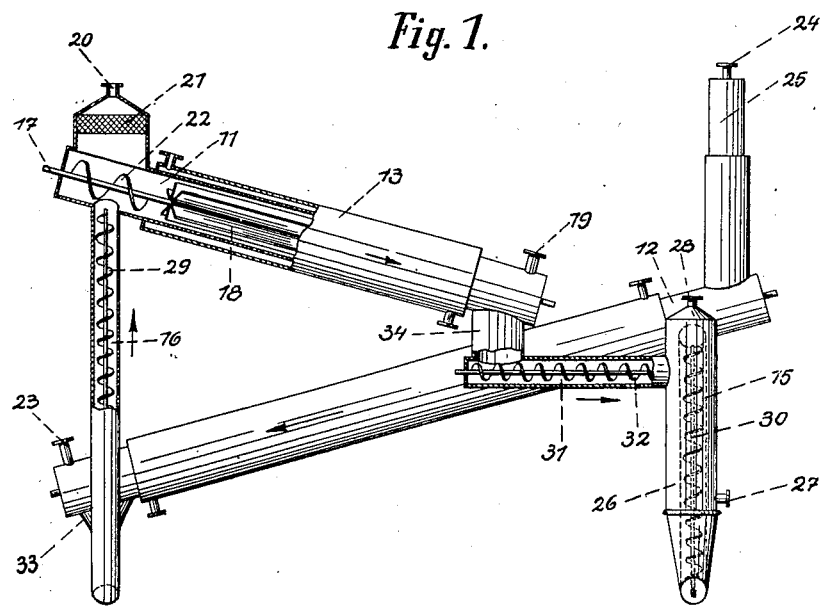
Fig. 1 is a side view (partially in section) of the proper apparatus in which the dehydration of the vapors or gases and the regeneration of the drying agent is carried out.
Figure 2:
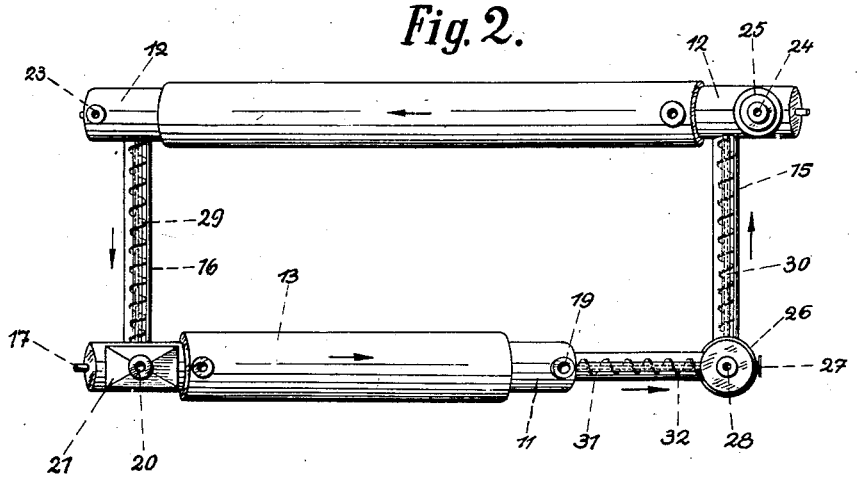
Fig. 2 shows the combination of Fig. 1 as seen from above.

The apparatus comprises two drums 11 and 12 arranged in any desired manner with respect to one another, preferably, however, somewhat inclined to each other. 11 is the drum in which the dehydration of the vapors or gases is performed. It is provided with a jacket 13 in order to maintain the desired temperature in the drum. This jacket may be subdivided into several compartments 13 and 13' (cf. Fig. 4), if a differentiated temperature in different parts of the drum is desired, or if the reaction heat set free by water absorption of the anhydrous calcium sulfate is utilized for heating or vaporizing the liquid to be dried.

12 is a similar drum for regenerating the dehydrating agent (for instance, calcium sulfate semihydrate) by heating it to a temperature at which it loses the water taken up in the drying drum 11. The heating of the drum 12 may be effected either within or from outside by superheated steam, by vapors of substances having a boiling point at which the drying agent loses the water taken up in the dehydration phase, by furnace gases or by electrical heating. Drums 11 and 12 are connected with each other by conveying tubes 15 and 16 in which conveyers 29 and 30, for instance, in the form of a continuous worm are provided for circulating the drying agent through the whole system.

In drum 11 a rotating shaft 17 is provided bearing a continuous worm or series of interrupted paddles 18 which distribute the drying agent during its passage through the drums and fling it against the inner wall of the latter while it is forwarded therethrough, so that it is brought into intimate contact with the water containing vapors.

Drum 12 contains a similar means for contacting the pulverulent drying agent with the heated surface at which it loses the absorbed water.

The steam thus driven out from the employed drying agent, is carried away by passing a current of air, preferably in a heated condition through this drum which enters the latter at 23 and leaves it at 24 after having passed a dust separator 25.

The vapors which are to be dried enter drum 11 at 19, while 20 is the exit for the dried gas after having passed a dust filter 21. For recarrying the fine dust of the drying agent removed from the filter, if necessary, by tapping, into the region of the conveyer 18, a short worm 22 may be mounted on the shaft 17 below the filter 21.

Between the drums 11 and 12 there may be interposed a small tower 26 in which the descending drying agent is freed from any adherent residue of liquid or gases, eventually taken up in drum 11 from the volatilized or gaseous substance to be dried or impurities contained therein and bound by the drying agent by a countercurrent of superheated steam or gases entering at 27. Such liquid or gases may be recovered in dilute form by condensation after having left the tower at 28. From drum 11 the drying agent is transported to this tower by a connecting tube 31, in which a rotating worm 32 is mounted. However, in most cases the drying process may be conducted without condensation of liquid upon the drying agent and under such conditions these additional means may be dispensed with. Then, drums 11 and 12 are connected directly as may be seen from Fig. 4.

In order to ensure a gas-tight connection between drums 11 and 12, so that only the drying agent is circulated without allowing vapors to pass from drum 11 to drum 12 or vice versa, to hinder the passage of air from drum 12 to drum 11, the connecting tubes 15 and 16 are situated at one end at a lower level than the drums and operate in an upwardly inclined direction, the drying agent being supplied to them through short down pipes 33 and 34. In said down pipes and in the inclined tubes 15 and 16 always a sufficient amount of the pulverulent drying agent may be allowed to accumulate by a suitable adjustment of the conveyers 29 and 30, so that gas circulation between drums 11 and 12 is completely avoided.

This effect is gained at best when constructing conveyers 29 and 30 somewhat shorter than the corresponding tubes 16 and 15. Under these conditions a stopper of the pulverulent drying agent is formed which is slowly pressed into the drums 11 and 12. The same closure may be formed by short connecting tubes between the drums 11 and 12 and the tubes 15 and 16, as may be seen, for instance, in Fig. 4 at 42.

The performance of the drying operation in our apparatus may be illustrated with reference to Fig. 4. For the sake of clarity, we describe the dehydration of ethyl alcohol with the aid of anhydrous calcium sulfate without limiting the invention to these specific features.

In Fig. 4 35 is a pump which carries the alcohol containing water to a storage vessel 36 from which it flows through a preheater 37 to the vaporizer 38. The alcohol vapors enter the drying drum 11 at 19 and leave it at 20 after having passed the gas filter 21. Then the dried vapors are guided through the jacket 39 of the preheater 37 and are condensed in the condenser 40 from which water-free ethyl alcohol may be withdrawn after having been filtered again in the liquor filter 41.

The anhydrous calcium sulfate entering drum 11 at 42, passes it in counter-current to the alcohol vapors as indicated by an arrow. It readily takes up the water of the moist vapors and is supplied into the down pipe 34 from which it is transported through the connecting pipe 15 into the regenerating vessel 12. It passes the latter in counter-current to the current of air heated at 43 and introduced into said drum at 23. This drum 12 is heated to a temperature of about 160 to about 200° C. by vapors of, for instance, dichlorobenzene which is vaporized in the vessel 44.

By a suitable adjustment of the conveyers 29 and 30 and of those mounted in drums 11 and 12, always a sufficient amount of calcium sulfate is accumulated in the down pipes 33 and 34 and in the tube 42, so that no gas circulation between the drums becomes possible.

In order to utilize as far as possible as well the heat taken up by the calcium sulfate during its regeneration as the heat evolved in the exothermic reaction between anhydrous calcium sulfate and steam, the vaporization or preheating of the alcohol may be carried out by leading it partly through the jacket 13 or by introducing a part of the liquid alcohol directly into the drying drum 11. By suitable adjustment of the valves installed in the tubing for the water containing alcohol, the latter may be preheated at 39 before being vaporized at 38, it may be preheated or even vaporized in the jacket 13 or in both devices. If the heat in drum 11 is raised to a temperature at which the drying agent does not absorb water, this excessive heat may be utilized by introducing directly the liquid alcohol into drum 11, as indicated at 45, whereat it is vaporized while cooling the anhydrous calcium sulfate.

What we claim is:—

1. In an apparatus for continuously drying volatilized substances comprising a dehydrating drum and a second drum for regenerating a solid drying agent, vertically arranged pipes leading down from the discharge end of each drum, a pair of upwardly inclined tubular conduits each connected at its upper end to one drum and at its lower end to the lower end of the vertical pipe leading from the other drum, and means in each of said conduits for conveying a solid through said conduits in an upward direction, said means being adjustable to cause a quantity of the drying agent to accumulate in each of said vertical pipes to form a seal to prevent passage of vapors between the drums.

2. Apparatus as claimed in claim 1 wherein each conduit is continuously inclined upwardly from the base of said vertical pipes to its point of connection to the charging end of the associated drum.

3. Apparatus as claimed in claim 1 wherein the discharge end of each tubular conduit includes a section extending beyond the adjacent end of the conveying means located therein whereby sealing plugs of the drying agent are formed within said sections to seal said drums from each other.

4. An apparatus for continuous drying of organic or inorganic volatile substances comprising in operative combination two coacting drums, means for keeping a desired temperature in said drums, vertically arranged pipes leading down from the discharge end of each drum, a pair of upwardly inclined tubular conduits each connected at its upper end to one drum and at its lower end to the lower end of the vertical pipe leading from the other drum, means for continuously circulating a pulverulent drying agent through said drums and said conduits including means in each of said conduits for conveying the drying agent therethrough in an upward direction, the conveying means in said conduits being adjustable to cause a quantity of the drying agent to accumulate in each of said vertical pipes to form a seal to prevent passage of vapors between the drums and means for guiding gases through one of the said drums in counter-current to the circulating means mounted therein.

5. An apparatus for continuous drying of organic or inorganic volatile substances comprising in operative combination a dehydrating drum for the vapors or gases to be dried, provided with a subdivided jacket and with a rotating axis bearing means for flinging a pulverulent drying agent against the inner wall of said drum, a regenerating drum for the drying agent, a device for heating said second drum, means for guiding a current of air through the latter, vertically arranged pipes leading down from the discharge end of each drum, a pair of upwardly inclined tubular conduits each connected at its upper end to one drum and at its lower end to the lower end of the vertical pipe leading from the other drum, means for continuously circulating the drying agent through said drums and conduits including means in each of said conduits for conveying the drying agent therethrough in an upward direction, said conveying means in said conduits being adjustable to cause a quantity of the drying agent to accumulate in each of said vertical pipes to form a seal to prevent passage of vapors between the drums.

THEODOR WALLIS.
OSKAR FALEK.